June 11, 1940.  E. WILCKENS  2,203,760
ULTRA-SHORT WAVE TRANSMITTING AND RECEIVING DEVICE
Filed April 23, 1937
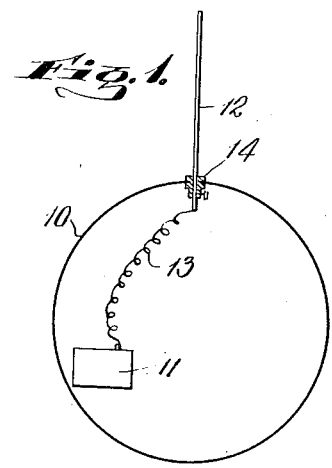
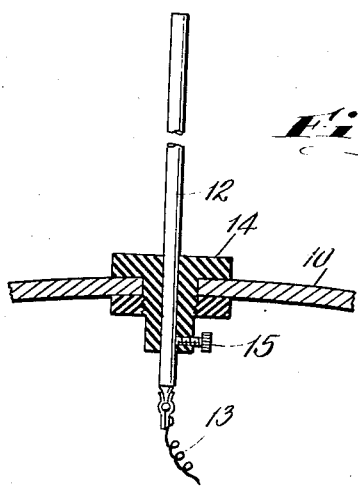
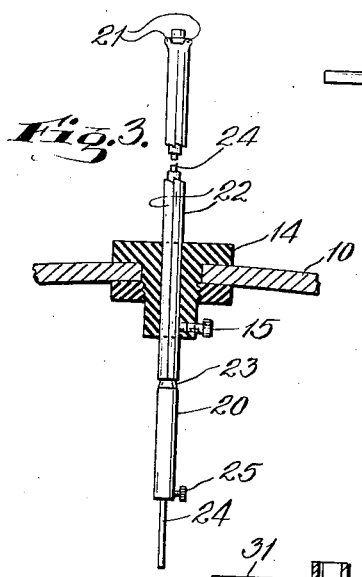
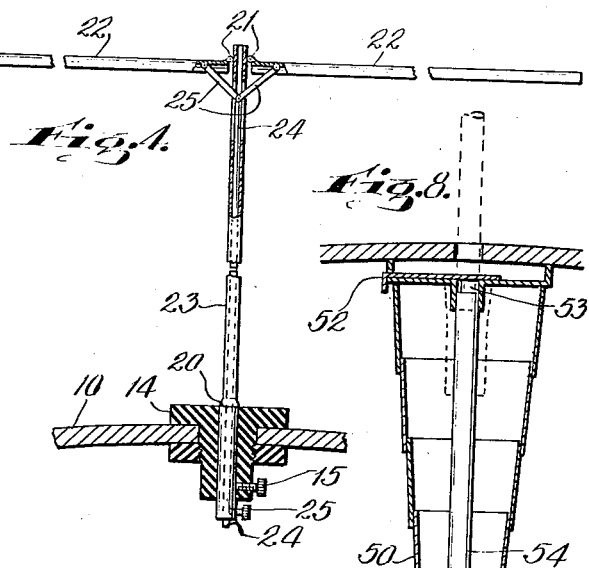
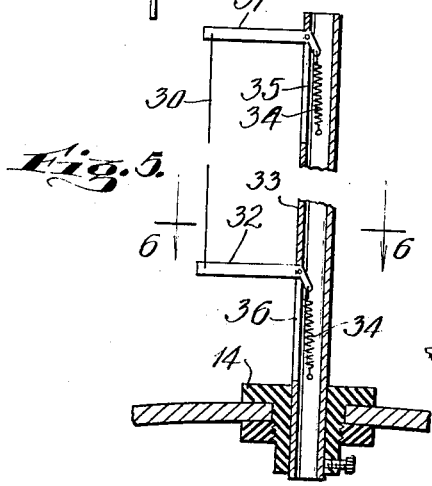
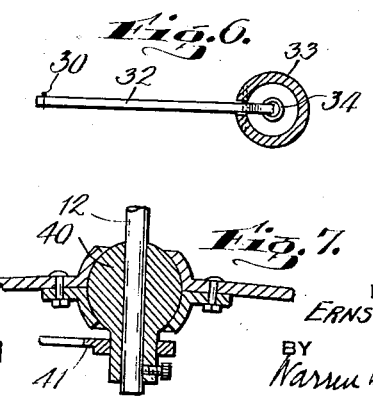
INVENTOR
ERNST WILCKENS
BY
Warren Drury Lun Foster
ATTORNEY

UNITED STATES PATENT OFFICE 2,203,760

ULTRA-SHORT-WAVE TRANSMITTING AND RECEIVING DEVICE

Ernst Wilckens, Berlin-Sudende, Germany, assignor to Julius Pintsch Kommanditgesellschaft, Berlin, Germany Application April 23, 1937, Serial No. 138,547
In Germany March 13, 1936

1 Claim. (Cl. 250—33)

This invention relates to transmitting and receiving devices for ultra-short-wave radio communication.

Ultra-short-wave transmitters and receivers are often utilised on aircraft or in locations wherein the aerial which radiates the energy is disposed outside the space or chamber containing the current-generating or controlling devices and wherein the outside space during the intended operation of the device is inaccessible. Such cases arise for example during journeys in stratosphere balloons, in all-metal aircraft or similar vehicles. If during journeys in such devices the aerial is put out of action for example due to freezing or by mechanical deformation or destruction, the system may be put transitorily or wholly out of operation. The use of the transmitting and receiving arrangement may also be prevented when the aerial loses its value through the influence of conditions outside its special characteristics.

It is one object of this invention to provide a transmitting or receiving device for ultra-short-wave radio communication which is constructed and arranged so as to overcome the above recited disadvantages.

Another object of the invention is to provide an aerial fitting for use in ultra-short-wave radio communication which can be replaced as desired by remote control.

According to the present invention the ultra short wave transmitting and receiving device is constructed in such manner that those elements of the device which are located outside the control chamber are readily detachable from the remaining elements and are further detachable by actuation from within the inner control chamber.

By this arrangement it becomes possible to separate the aerial which is no longer operative and other externally arranged elements from the elements located in the inner chamber and to cast off said elements for example to the exterior concurrently with the positioning of a replacement device.

As soon as the now useless elements of the device have been thrown off the renewal or replacement device may be positioned from the inner chamber. It is preferable to maintain the necessary lead out opening as small as possible so that any influences prevailing outside the control chamber cannot act towards the interior thereof. In many cases it may be necessary to construct equalising or lock chambers so as to be able to convey the replacement members to the exterior, but in general, it will suffice to maintain a tight but slidable contact between the aerial structure and the bushing or equivalent used to support such aerial and provide for its movement into operating condition outside of the inner chamber. The releasability of the outer elements on the other hand results in the possibility of connecting the replacement members in a more simple manner with the elements located in the inner chamber of the device.

In order to allow passage of the replacement members through as small openings as possible it is advisable to utilise an aerial device which in the condition in which it is ready for replacement purposes is of a relatively long narrow shape and which after being pushed to the outside can from the interior be brought into another shape, namely, into that form which is essential for its radiating properties whilst in the former case it was of a form particularly favourable for its passage through a long narrow opening. For example aerials of this character may be made collapsible in the form of an umbrella and in this form pushed through an opening and when the umbrella part is located outside the opening it may be spread apart from the interior chamber.

For the abovementioned purposes decimetre and centimetre waves should especially be used in order to maintain the aerial itself of small dimensions. The aperture through the wall which for example in balloons would be made through the metallic sphere, may also be utilised for high frequency conduction since the wave generator will be located in the interior and the aerial outside and conduction of energy must take place between the two.

The beam aerial may be combined with the energy conductor to form a rigid unit or it can be arranged so as to be movable on the end of the energy conductor so that the direction of the beam radiation can be controlled from inside the chamber. An arrangement of this character can for example be produced by inserting in the opening through which the replacement members are passed a spherical bushing in which is located a ball and socket guide with which the externally disposed aerial is rigidly connected. The bushing can readily be detached in known manner from the opening.

In order to produce a favourable directing action group transmitters and receivers can be arranged externally of the chamber which if constructed so as to be movable provide particularly sharp focussing.

The invention is disclosed in the following specification of which the accompanying drawing forms a part, and in which:

Figure 1 is a diagrammatic cross section through the body of a ship showing a simple form of aerial mounted therein.

Figure 2 is an enlarged partial section of Figure 1 showing one method of mounting the aerial.

Figure 3 is a view of an aerial in collapsed form being inserted into place.

Figure 4 is a view of the aerial shown in Figure 3 in its extended form.

Figure 5 illustrates another form of aerial in its operating position, the lower portion of the aerial structure not being shown.

Figure 6 is a section on line 6—6 of Figure 5.

Figure 7 is a detail section of a modified means of mounting an aerial.

Figure 8 is a further modification of mounting an aerial using a form of air lock.

In Figure 1, 10 indicates the shell of an airplane or gondola body of an air ship in which radio apparatus 11 is located for the sending and receiving of electric impulses through the medium of an aerial 12 located on the exterior of the body 10, the aerial 12 being connected to the apparatus in the conventional manner such as by a conductor 13. The aerial rod may be mounted in an insulated bushing 14 fixed in the shell 10, the rod being held against displacement by the set screw 15. Desirably, the aerial rod is circular in cross section and arranged to engage the inner wall of the bushing 14 in tight, but slidable contact. In order to make a replacement of the aerial it is only necessary to loosen the set screw and eject the old aerial by the act of forcing the new one into place. By this means, communication between the inside space of the ship with the outside space is prevented.

In Figures 3 and 4 I have illustrated a different type of aerial wherein I provide a supporting stanchion 20 which may be mounted in operative position in the bushing 14 in a manner similar to that of Figures 1 and 2. Pivoted as at 21 to the outer end of this stanchion are two arms 22 which may be brought into any suitable angle to the stanchion 20 when in position for use. These arms are arcuate in cross section so that when in collapsed position for inserting into the bushing 14, they fit snugly about the reduced portion 23 of the stanchion 20, the maximum diameter of the assembly allowing for substantially gas-sealing but sliding clearance in the bore of the bushing 14. The stanchion 20 is shown as being hollow to permit for an operating rod 24. To the outer end of said rod 24 are connected two links 25, these links being connected at their other ends to the arms 22.

Thus when the collapsed aerial has been inserted into position in bushing 14 and locked into place by set screw 15, rod 24 is pushed outwardly to extend the arms 22 of the aerial to any desired angle with the line of the stanchion. This actuating rod may be held in its adjusted position by means of set screw 25'. It is only necessary to remove screw 25' and loosen screw 15 in order to eject this aerial for replacement.

In Figures 5 and 6 I have illustrated a further type of aerial wherein 30 represents an aerial carried by two pivoted arms 31 and 32 these arms being pivoted to the stanchion 33, which may act as the reflector in directional radio use. This assemblage provides a parallel movement of the aerial 30 when it is liberated by passing through the bushing 14. Springs 34 are provided to cause this movement and the arms 31 and 32 come to rest in a right angle position relative to the stanchion 33 by reason of their abutment against the upper ends of slots 35 and 36. These slots provide the necessary recesses for the arms 31 and 32 when in their collapsed position. It is to be understood that the lower portion of the stanchion 33 (not shown) has a suitably closed end, to which the lead 13 from a radio apparatus 11 may be attached in the manner illustrated in Fig. 1. Such closed end, plus the substantial gas-sealing contact with the bushing 14 which is inherent in all of the structures hereinbefore discussed, makes such aerial assembly proof against any substantial amount of infiltration of outer atmosphere into the chamber or loss of the atmosphere of the chamber to the outer atmosphere.

In all of these forms the aerial may be rotated about its vertical axis in directional radio use by loosening the set screw 15 while making this axial adjustment but in Figure 7 I have illustrated a ball and socket means for accomplishing this objective. The ball member 40 may be provided with an arm 41 for imparting this axial motion and suitable calibrations (not shown) may also be provided for indicating angularity.

In Figure 8 I have shown a form of air lock which may be used consisting of a collapsible tube 50 and the lower segment 51 may support the aerial in operating position as shown by dotted lines. As indicated in Fig. 8, the upper end of the lower segment 51 is provided with a socket portion adapted to frictionally engage the central flanged element of the aperture 53 and thus to hold the aerial 54 into operative position while preventing the flow of gas around the surface of contact of the aerial 54 with the lower segment 51. The full line position shows the manner of sealing the cabin space from outside atmosphere when making an aerial replacement. A slide gate 52 is provided to close the aperture 53 when the collapsible tube 50 and aerial 54 are removed.

What I claim is:

In an ultra-short wave transmitting and receiving system, the combination with an antenna detachably associated with the operative elements of said system, of antenna supporting means arranged to permit slidable passage of said antenna from the interior of a chamber housing operative elements of said system to a desired position externally thereof and arranged to receive an end of a replacement antenna conjointly with said first mentioned antenna, said supporting means including a collapsible tube housing for said antenna, having a collar-provided opening arranged in register with an opening in a wall of said chamber and an antenna receiving bushing arranged for engagement with said collar to support said bushing internally of said housing when said antenna is in position externally of said chamber, said housing having gate means arranged to substantially seal said housing opening against the influx of outer atmosphere into said chamber when said antenna is fully withdrawn into said chamber.

ERNST WILCKENS.